United States Patent [19]
Cook et al.

[11] 3,736,487
[45] May 29, 1973

[54] STEPPING MOTOR DRIVE CIRCUIT

[75] Inventors: Harold D. Cook, Wheaton; Owen F. Davis, Des Plaines, both of Ill.

[73] Assignee: Teletype Corporation, Skokie, Ill.

[22] Filed: Aug. 3, 1966

[21] Appl. No.: 570,077

[52] U.S. Cl. ................................. 318/696, 318/685
[51] Int. Cl. ............................................. H02k 37/00
[58] Field of Search ................. 318/254, 138, 696, 318/685

[56] References Cited
UNITED STATES PATENTS

| 3,328,658 | 7/1964 | Thompson | 318/138 |
| 3,345,547 | 10/1967 | Dunne | 318/138 |
| 3,386,018 | 5/1968 | Smith-Vaniz | 318/138 |

Primary Examiner—G. R. Simmons
Attorney—J. L. Landes and R. P. Miller

[57] ABSTRACT

A circuit for moving the rotor of a stepping motor from one position to another without vibration or oscillation including means for energizing the magnets of the stepping motor that would normally be energized to move the rotor of the motor from a first position to a second position for a first predetermined period of time, means for energizing the magnets that would normally be energized to return the rotor from the second position to the first position for a second predetermined period of time and means for re-energizing the magnets would normally be energized to move the rotor from the first position to the second position.

3 Claims, 1 Drawing Figure

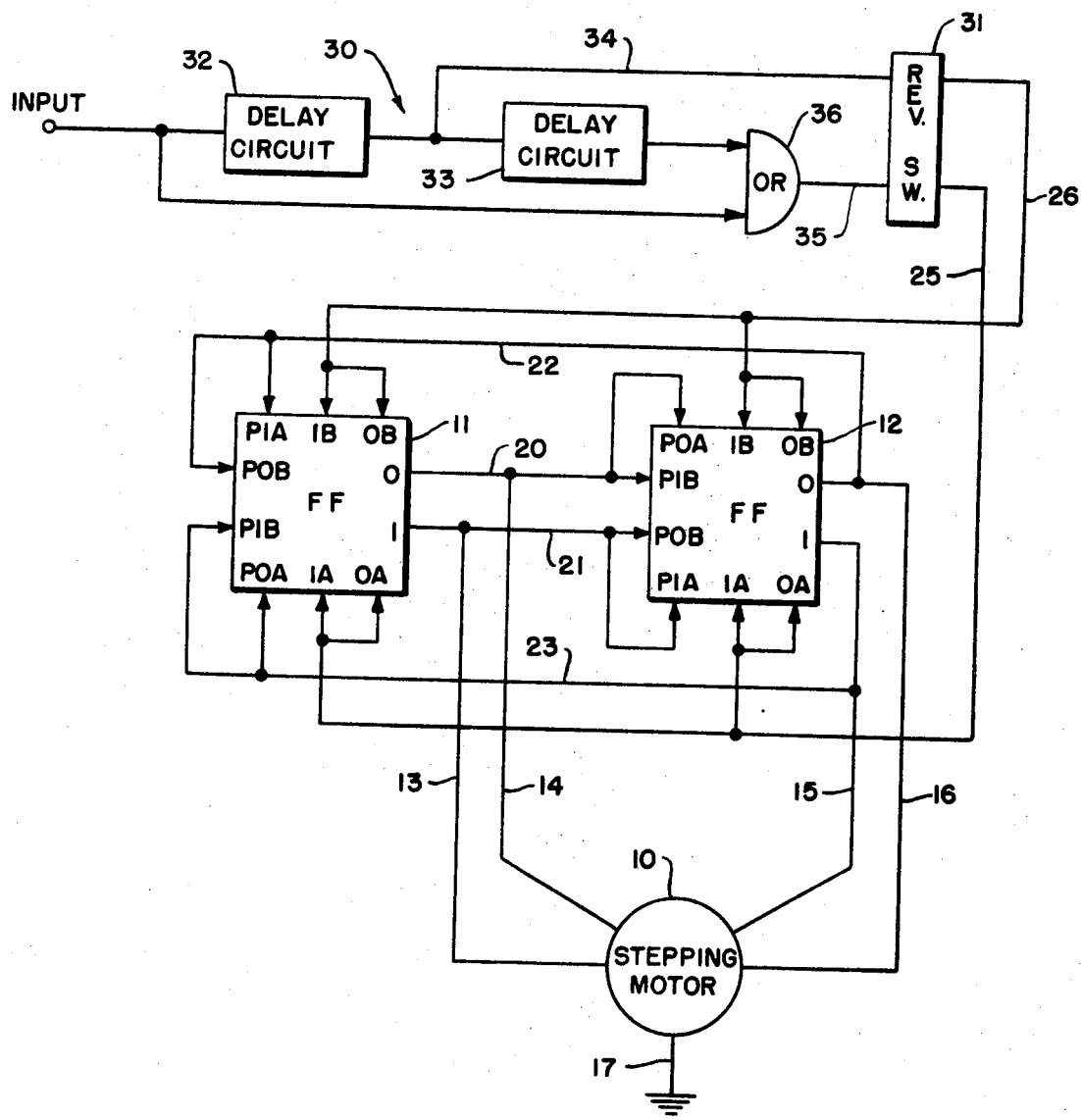

STEPPING MOTOR DRIVE CIRCUIT

This invention relates to stepping motor drive circuits and more particularly to circuits for operating stepping motors at high rates of speed.

In recording devices stepping motors are often employed to move the recording medium because the inherent incremental movement of stepping motors affords precise control over the positioning of the recording medium and therefore allows a maximum amount of recording per unit length of recording medium. As recording speeds have increased it has become necessary to operate the stepping motors used in recording devices at increasingly higher rates of speed. This has caused problems since, stepping motors which are operated at high rates of speed tend to vibrate or oscillate excessively upon reaching a position to which they are stepped.

Accordingly, an object of this invention is to provide a circuit for operating stepping motors at high rates of speed.

Another object of this invention is to provide a circuit for causing a stepping motor to step from one position to another position at high speed with a minimum of vibration.

In a preferred embodiment of the invention these and other objects are achieved by applying a pulse to a stepping motor which causes the stepping motor to step in a first direction. After this pulse is applied for a predetermined period of time, a reverse pulse which normally would cause the stepping motor to step in the opposite direction is applied. After the reverse pulse has been applied for a second predetermined period of time the original pulse is reapplied. This causes the stepping motor to move from a first position to a second position rapidly without vibration since any tendency of the motor to vibrate upon reaching its new position is damped by the reverse pulse.

A more complete understanding of the invention may be had by referring to the following detailed description when taken in conjunction with the drawing wherein there is schematrically illustrated a stepping motor drive circuit employing the present invention.

In the ensuing description of the operation of the circuit shown in the drawing the terms "positive" and "negative" potentials are used to identify the relative voltages being employed. It should be understood that in actual practice such potentials need not be positive or negative but, by way of example, could be 0 volts and −6 volts or +6 volts and 0 volts, respectively, etc. depending on the particular circuit components utilized. It is believed, however, that the use of the terms "positive" and "negative" will serve to differentiate the relative potentials used and will facilitate an understanding of the operation of the circuit.

In the drawing there is schematically illustrated a stepping motor 10 which is of the fully reversible type. Preferably the stepping motor 10 is of the type having a plurality of stator electromagnets arranged in a circular array around a rotatably mounted rotor. The rotor is magnetized so that various points on the rotor are of north or south magnetic polarity. The stator magnets are wound in a bifilar manner so that they may be polarized either identically with or oppositely to the polarity of any given portion of the rotor at any given time.

When the rotor of the stepping motor 10 is held in any given position the stator magnet directly in line with a particular portion of the rotor is magnetized to the opposite polarity of that portion of the rotor whereas other stator magnets are magnetized to the same polarity as that particular portion of the rotor. When it is desired to move the rotor in a given direction this other stator magnet is magnetized to an opposite polarity from the polarity of the particular section of the rotor and the magnet which has been aligned with the particular section of the rotor is magnetized to the same polarity as the polarity of that particular section of the rotor. This causes the particular section of the rotor to be repelled away from the magnet with which it had been aligned and to be attracted toward the other stator magnet in a direction of desired rotation of the rotor. Therefore, the particular section of the rotor is quickly and positively driven by magnetic action through an incremental step of rotation and into alignment with a stator magnet one incremental step away from the one with which it had been aligned. This action is repeated around the periphery of the rotor at various points so that more than one magnet serves to move the rotor through each incremental step.

Although any suitable stepping motor of the type described may be employed in conjunction with the present invention, a suitable stepping motor for use with the invention is the motor sold by the Superior Electric Company of Bristol, Connecticut under the trademark SLO-SYN and identified by that company as Type SS25–1002.

Also shown in the drawing are two boxes 11 and 12 which are labeled FF. These boxes represent flip-flop circuits of the type disclosed in FIG. 2 of a copending application, Ser. No. 469,522, filed in the name of H. D. Cook on July 6, 1965. The particular internal circuitry of these flip-flops forms no part of this invention and reference may be had to application Ser. No. 469,522 for the details of their operation. It should be noted, however, that these flip-flops are of the type in which a positive trigger input must be gated with a positive direct current priming potential before the trigger input has any affect on the operation of the flip-flop. For convenience the two states or levels of the flip-flop are designated as "0" and "1." The priming inputs for a level of the flip-flop are designated by the letter P. The priming input which is gated with a particular trigger input is designed in the drawing by the same letter A or B at both the trigger and the priming inputs of the flip-flop. For example, a trigger input used to set a flip-flop to its "0" level is designated on the drawing as 0B or 0A and this trigger input is gated with a priming input P0B or P0A, respectively. The outputs of the flip-flops are labeled merely "0" or "1" with a positive output potential being obtained from the output to which the flip-flop is set and a negative potential being obtained from the other output at the same time.

The outputs of the flip-flops 11 and 12 are used to control the operation of the stepping motor 10 through a plurality of leads 13, 14, 15 and 16 which extend to the magnets in the stepping motor 10 and which are used to pass current at the output potentials of the flip-flops 11 and 12 through the magnets of the stepping motor 10 to a source of ground potential connected to a common lead 17 of the stepping motor 10. For convenience and simplicity of description of the operation of the flip-flops 11 and 12 in controlling the magnets of the stepping motor 10 will first be described in the manner employed in the prior art, after which the changes in the operation of the flip-flops which are made in the practice of the present invention will be explained.

Assume first that both the flip-flops 11 and 12 are in their "0" levels or states. At this time an output lead 20 connected to the "0" output of the flip-flop 11 and also connected to the priming inputs P0A and P1B of the flip-flop 12 is at positive potential whereas an output lead 21 connected to the "1" output of the flip-flop 11 and also connected to the priming inputs P0B and P1A of the flip-flop 12 is at negative potential. Thus, the triggering inputs 0A and 1B of the flip-flop 12 are primed by the output of the flip-flop 11 whereas the trigger inputs 0B and 1A of the flip-flop 12 are not primed since the "1" output of the flip-flop 11 is negative.

Since the flip-flop 12 is also in "0" state a positive potential is applied to a lead 22 connected to its "0" output. The lead 22 is also connected to the priming inputs P1A and P0B of the flip-flop 11 and accordingly the triggering inputs 1A and 0B of the flip-flop 11 are primed. A lead 23 connected to the "1" output of the flip-flop 12 and also connected to the priming inputs P1B and P0A of a flip-flop 11 is, of course, maintained at negative potential when the flip-flop 12 is in its "0" state and, accordingly, the triggering inputs 1B and 0A of the flip-flop 11 are not primed.

Assume that it is desired to advance the stepping motor in a direction arbitrarily selected as forward. A positive pulse is applied to a forward lead 25 which is connected to both the 1A and 0A triggering inputs of both of the flip-flops 11 and 12. The flip-flop 12 is primed to its "0" level by the output of the flip-flop 11 but is not primed to its "1" level since the potential on the lead 21 is negative. Accordingly, when the positive pulse appears on the lead 25 the flip-flop 12 would be set to its "0" state except that it already is in its "0" state. Therefore, the positive potential appearing on the lead 25 has no effect whatsoever on the flip-flop 12.

On the other hand, the flip-flop 11 is primed to its "1" state by the positive potential of the "0" output of the flip-flop 12 which is applied through the lead 22 to the P1A priming input of a flip-flop 11. Thus, when the positive potential is applied through the lead 25 to the 1A triggering input of the flip-flop 11, the flip-flop 11 is driven to its "1" state. Therefore, as a result of a positive potential being applied to the forward lead 25, the flip-flops 11 and 12 change from a "0,0" condition to a "1,0" condition (the flip-flops being referred to in numerical order).

As a result of the change of state of the flip-flops 11 and 12, positive potential is no longer applied to the leads 14 and 16 extending to the stepping motor 10 but is instead applied to the leads 13 and 16 which are connected to the "1" output of the flip-flop 11 and the "0" output of the flip-flop 12, respectively. Conversely, the leads 14 and 15, which are connected to the "0" output of the flip-flop 11 and the "1" output of the flip-flop 12, are driven to negative potential. This change in the potentials applied to the input leads 13 through 16 of the stepping motor 10 is the precise change required to cause the rotor of the stepping motor 10 to rotate from the position with which it had been associated to the magnets next adjacent that position in the direction arbitrarily designated forward.

When it is desired to rotate the rotor of the stepping motor 10 another step in the forward direction, a second positive pulse is applied to the forward lead 25. Since the flip-flops 11 and 12 are in a "1" and a "0" state, respectively, the "1" output of the flip-flop 11 is at a positive potential and thus primes the priming inputs P0B and P1A of the flip-flop 12 through the lead 21. The flip-flop 12, however, primes the priming inputs P1A and P0B of the flip-flop 11 through the lead 22 connected to its "0" output. Thus, when the positive potential is applied to the lead 25 the flip-flop 11 does not change state since it is already in the "1" state to which it is primed. The flip-flop 12, however, does change state since it is primed to its "1" state by the "1" output of the flip-flop 11 and since it is in its "0" state. Accordingly, upon the application of a second positive potential to the forward lead 25 the flip-flops 11 and 12 change from a "1,0" condition to a "1,1" condition. This change changes the positive and negative potentials applied to the leads 15 and 16 of the stepping motor 10 and accordingly, the stepping motor is advanced one step in the forward direction.

When the flip-flops 11 and 12 are both in the "1" state, positive potentials are applied to the leads 21 and 23 from the "1" outputs of the flip-flops 11 and 12, respectively. Since the leads 21 and 23 are connected to the P0A and P1A priming inputs of the flip-flops 11 and 12, respectively, a third positive pulse on the forward lead 25 changes the state of the flip-flop 11 from its "1" state to its "0" state but has no effect whatsoever on the flip-flop 12 since that flip-flop is already in the "1" state to which it is primed. Accordingly, when a third positive potential is applied to the forward lead 25 the flip-flops 11 and 12 change from a "1,1" condition to a "0,1" condition, which results in a change of the potentials applied to the leads 13 and 14 and thereby causes the stepping motor 10 to advance one step in the forward direction.

When the flip-flops 11 and 12 are in their "0" and "1" states, respectively, the flip-flop 11 is primed to the "0" state by the "1" output of the flip-flop 12 and the flip-flop 12 is primed to the "0" state by the "0" output of the flip-flop 11. Accordingly, a fourth positive potential applied to the forward lead 25 has no effect on the flip-flop 11 which is already in the "0" state but instead causes the flip-flop 12 to change from its "1" state to its "0" state. This return the flip-flops 11 and 12 to their initial condition (0,0) and also returns the potentials applied to the leads 13 through 16 to their initial conditions. Thus, the input potentials applied to the magnets of the stepping motor 10 are returned to their original state.

From the foregoing description it will be evident that as positive potentials are applied to the lead 25 the condition of the flip-flops change in a regular pattern. This pattern is shown in the following table wherein a positive potential applied to the forward lead 25 always causes the flip-flops to change to the next lower state on the table:

0, 0
1, 0
1, 1
0, 1
0, 0
1, 0
1, 1
0, 1
0, 0
1, 0

1, 1
0, 1
0, 0

If it is desired to have the rotor of the stepping motor 10 rotate in a direction opposite to the forward direction, that is, in a reverse direction, it is necessary to have the flip-flops 11 and 12 change to the state which is next above any given state on the foregoing chart. This is accomplished by applying a positive potential to the reverse lead 26.

Assume that the flip-flops 11 and 12 are both in the "0" state. The P1B triggering input of the flip-flop 12 is primed through the lead 20 by the "0" output of the flip-flop 11, whereas the P0B triggering input of the flip-flop 11 is primed through the lead 11 by the "0" output of the flip-flop 12. Thus, a positive pulse on the reverse lead 26 which is connected to the triggering inputs 1B and 0B of both of the flip-flops 11 and 12 causes the flip-flop 12 to change to its "1" state but has no effect whatsoever on the flip-flop 11. Therefore, the flip-flops change from the "0,0" state to the "0,1" state, that is, they proceed to the next higher level in the foregoing chart. From this and from the foregoing description of the operation of the flip-flops 11 and 12 in response to positive inputs on the forward lead 25, it should be evident that a succession of positive inputs on the reverse lead 26 will cause the state of the flip-flops to proceed in an upwardly direction on the foregoing chart.

In conventional operation of the stepping motor 10, a positive potential is merely applied to the lead 25 whenever the rotation of the rotor is in the forward direction is desired whereas a positive potential is merely applied to the lead 26 whenever rotation of the rotor in the reverse direction is desired. It has been found, however, that operating the stepping motor 10 in this manner is not wholly satisfactory when very rapid steps of the rotor of the stepping motor are desired. The major difficulty experienced in conventional operation of the stepping motor 10 is a severe vibration of the rotor of the stepping motor upon reaching a new position. Thus, instead of rapidly and positively advancing from the first position to a second position and then remaining in a second position, the rotor moves from the first position to the second position and then vibrates or oscillates about the second position for a relatively long period of time. Such vibration or oscillation about a new position is very undesirable when the stepping motor 10 is used in conjunction with a recording device to move a recording medium through the device. This is because recording on the recording medium cannot take place until the recording medium is stationary, and thus recording on the recording medium must be delayed until the rotor of the stepping motor 10 stops vibrating or oscillating about a new position.

It has been found that the above described difficulty in the conventional operation of the stepping motor 10 can be almost completely eliminated if the circuit 30 which is attached to the leads 25 and 26 through a reversing switch 31 is used to operate the flip-flops 11 and 12. The circuit 30 includes a pair of delay circuits 32 and 33 of a type which emit a positive output pulse a predetermined time after the application of a positive input pulse. Thus, assuming that the reversing switch 31 connects a lead 34 which is attached to the output of the delay circuit 32 directly to the reverse lead 26 and connects a lead 35 attached to the output of an OR-gate 36 directly to the forward lead 25, a positive input pulse appearing on the input of the circuit 30 is applied to the forward lead 25 through the OR-gate 36 and thus causes the states of the flip-flops 11 and 12 to move one step downwardly on the foregoing chart. The potentials applied to the leads 13 through 16 are thereupon changed in the manner which causes the rotor of the stepping motor 10 to advance toward the next position in the forward direction.

The positive pulse on the input of the circuit 30 also triggers the delay circuit 32 and accordingly, after a predetermined period of time determined by the internal characteristics of the circuit 32, the delay circuit 32 produces a positive output pulse. This pulse is applied through the lead 34 and the reversing switch 31 to the reverse lead 26 and accordingly causes the states of the flip-flops 11 and 12 to move upwardly one step on the foregoing chart, that is, back to the state they were in before the input pulse was applied to the input of the circuit 30.

The change of the state of the flip-flops 11 and 12 causes the potentials applied to the leads 13 through 16 to be returned to their initial condition. Thus, the magnets of the stepping motor 10 no longer urge the rotor to move from the first position to the second position in the forward direction but instead urge the rotor to move back from the second position to the first position. This produces a retarding effect on the motion of the rotor of the stepping motor 10 and thus serves to damp that motor and to slow the rotor of the stepping motion as it approaches the second position.

The output of the delay circuit 32 in the circuit 30 also is applied to a delay circuit 33 which, after a predetermined time determined by the internal characteristics of the delay circuit 33 applies a positive pulse through the OR-gate 36 to the forward lead 25. This causes the flip-flops 11 and 12 to change to a state which is one step downwardly on the foregoing chart from the state at which they were after the delay circuit 32 applied its output pulse through the lead 34 to the reverse lead 26. That is, the output of the delay circuit 33 causes the flip-flops 11 and 12 to return to the state to which they were driven when the input signal was applied through the OR-gate 36 and the lead 35 to the forward lead 25. The effect of the return of the flip-flops 11 and 12 to the condition in which they cause the rotor of the stepping motor 10 to move from the first position to the second position is to cause the rotor of the stepping motor 10 to continue in its movement to the second position and to settle in the second position with a minimum of vibration and oscillation.

The time periods of the initial pulse and the reversing pulse as determined by the delay circuits 32 and 33 consume practically the entire time period that it takes for the rotor of the stepping motor 10 to move from a first position to a second position. For example, it has been found that when the circuit 30 is employed in conjunction with the stepping motor identified above, the reverse pulse which is applied by the delay circuit 32 should occur approximately 1 millisecond after the initial input pulse. The final forward pulse which is applied to the forward lead 25 by the delay circuit 33 should also occur approximately 1 millisecond after the reverse pulse, at which time the rotor is actually in its new position. The next input signal can then follow the final forward pulse by approximately 1 millisecond so that the total time period used to complete a movement of the rotor of the stepping motor 10 from a first position to a second position is approximately 3 milliseconds.

The function of the reversing switch 31 is to apply the output of the OR-gate 36 to the reverse lead 26 and to apply the output of the delay circuit 32 to the forward lead 25 whenever it is desired to cause the rotor of the stepping motor 10 to move in the reverse direction. Thus, instead of the pulse sequence forward-reverse-forward which is applied by the circuit 30 to cause the rotor of the stepping motor 10 to advance from a first position to a second position in the forward direction quickly without vibration or oscillation, a pulse sequence reverse-forward-reverse is applied whenever the reversing switch 31 is operated thereby causing the rotor to travel quickly from a first position to the second position in a reverse direction without vibration or oscillation.

Although a particular embodiment of the invention is shown in the drawings and described in the foregoing specification it will be understood that the invention is not limited to that specific embodiment, but is capable of modification and rearrangement, and substitution of parts and elements without departing from the scope of the invention.

What is claimed is:

1. In a stepping motor operating circuit of the type including a pair of flip-flops each having inputs and having outputs connected to the inputs of a stepping motor, a pair of input leads and circuitry interconnecting the input leads, the outputs of the flip-flops, and the inputs of the flip-flops so that successive pulses on one of the input leads cause the flip-flops to produce output pulses that rotate the stepping motor in one direction and so that successive pulses on the other input lead cause the flip-flops to produce output pulses that rotate the stepping motor in the other direction, the combination with the input leads of a drive circuit including a pulsing lead, a pair of delay circuits each having an input and an output and means for connecting the pulsing lead to one of the input leads and to the input of one of the delay circuits, for connecting the output of said one of the delay circuits to the other of the input leads and to the input of the other of the delay circuits and for connecting the output of said other of the delay circuits to said one of the input leads so that a single pulse on the pulsing lead changes the flip-flops from a first condition to a second condition thereby energizing the stepping motor to move its rotor from a first position to a second position then changes the flip-flops from the second condition to the first condition thereby energizing the stepping motor to move its rotor from the second position to the first position then changes the flip-flops from the first condition to the second condition thereby energizing the stepping motor to move its rotor from the first position to the second position.

2. The combination according to claim 1 further including a reversing switch connected between the pulsing circuit and the input leads and adapted to cause the pulsing circuit to operate upon the input leads so that the flip-flops energize the stepping motor in a reverse direction.

3. The combination according to claim 1 wherein said one of the delay circuits changes the flip-flops from the second condition to the first condition after a predetermined period of time and wherein said other delay circuit returns the flip-flops to the first condition after approximately the same period of time.

* * * * *